United States Patent
Tokizaki (10) Patent No.: US 11,276,425 B2
(45) Date of Patent: Mar. 15, 2022

(54) DISK DEVICE AND MANUFACTURING METHOD THEREOF

(71) Applicants: Kabushiki Kaisha Toshiba, Tokyo (JP); Toshiba Electronic Devices & Storage Corporation, Tokyo (JP)

(72) Inventor: Tomoyuki Tokizaki, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/993,373

(22) Filed: Aug. 14, 2020

(65) Prior Publication Data

US 2021/0272593 A1    Sep. 2, 2021

(30) Foreign Application Priority Data

Feb. 27, 2020  (JP) .............................. JP2020-031687

(51) Int. Cl.
*G11B 5/48*    (2006.01)

(52) U.S. Cl.
CPC ............ *G11B 5/486* (2013.01); *G11B 5/4813* (2013.01); *G11B 5/4846* (2013.01); *G11B 5/4853* (2013.01)

(58) Field of Classification Search
None
See application file for complete search history.

(56) References Cited

U.S. PATENT DOCUMENTS

| | | | |
|---|---|---|---|
| 4,544,972 A | 10/1985 | Kogure et al. | |
| 5,870,253 A * | 2/1999 | Ogawa ................. | G11B 25/043 360/245.9 |
| 6,098,271 A | 8/2000 | Yamamoto et al. | |
| 6,690,549 B1 | 2/2004 | Aikawa et al. | |
| 8,917,483 B2 | 12/2014 | Sugimoto et al. | |
| 9,324,344 B1 * | 4/2016 | Chen ..................... | G11B 5/4853 |
| 10,657,993 B1 * | 5/2020 | Uehara ................ | G11B 25/043 |
| 2012/0033395 A1 * | 2/2012 | Ishii ..................... | H05K 3/4644 361/784 |
| 2019/0287557 A1 * | 9/2019 | Akatsuka ............. | G11B 5/4813 |
| 2019/0287558 A1 * | 9/2019 | Hasegawa ............ | G11B 5/4813 |

* cited by examiner

*Primary Examiner* — Carlos Garcia
(74) *Attorney, Agent, or Firm* — Allen & Overy LLP (57) ABSTRACT

According to one embodiment, a disk device includes a first head actuator, a second head actuator, and a wiring board unit connected to the first head actuator and the second head actuator. The wiring board unit includes a flexible printed wiring board including a base portion and at least two extension portions extending from the base portion, and each of the extension portions includes a joint portion provided with connection pads and a cutting work trace portion. One joint portion is attached to a first actuator block, and the connection end portion of a first wiring member is joined to the connection pads. Another joint portion is attached to a second actuator block, and the connection end portion of a second wiring member is joined to the connection pad.

6 Claims, 11 Drawing Sheets

DISK DEVICE AND MANUFACTURING METHOD THEREOF

CROSS-REFERENCE TO RELATED APPLICATIONS

This application is based upon and claims the benefit of priority from Japanese Patent Application No. 2020-031687, filed Feb. 27, 2020, the entire contents of which are incorporated herein by reference.

FIELD

Embodiments described herein relate generally to a disk device and a manufacturing method thereof.

BACKGROUND

As a disk device, for example, a hard disk drive (HDD) comprises a magnetic disk disposed in a housing, a spindle motor which supports and rotates the magnetic disk, a head actuator which supports a magnetic head, a voice coil motor which drives the head actuator, a flexible printed circuit board unit, and the like.

The head actuator includes an actuator block having a plurality of arms and a unit bearing mounted on the actuator block. One or two suspension assemblies (sometimes referred to as a head gimbal assembly (HGA)) supporting a magnetic head are attached to each arm. A flexible printed circuit board (FPC) unit is connected to the head actuator. The FPC unit has an FPC having a plurality of signal lines for passing various electric signals and drive signals, a ground line, and the like, and a connector provided at one end portion of the FPC.

In recent years, as the storage capacity of HDDs has increased, the number of installed magnetic disks has also increased. In order to support a large number of magnetic disks, a so-called multi-actuator or split actuator is proposed in which the head actuator is divided into a plurality of independently rotatable head actuators, for example, two head actuators, and the two head actuators are arranged in a stacked manner. The FPC unit connected to such a multi-actuator has two divided connection end portions, and these connection end portions are independently connected to the respective head actuators.

As described above, in a case where the two connection end portions of the FPC unit are independent, in the manufacturing process, a position shift may occur when the electronic component is mounted on the FPC unit in a component state, or the two connection end portions may interfere with each other to be damaged when the FPC unit in the component state is transported, which is problematic. Further, when the two connection end portions are connected to the head actuator, positioning and connecting work are difficult.

DETAILED DESCRIPTION

Various embodiments will be described hereinafter with reference to the accompanying drawings. In general, according to one embodiment, a disk device comprises: a plurality of disk-shaped recording media rotatably provided; a first head actuator which comprises a first actuator block rotatably supported by a support shaft and a first wiring member including a connection end portion arranged on the first actuator block; a second head actuator which comprises a second actuator block rotatably supported by the support shaft and a second wiring member including a connection end portion arranged on the second actuator block; and a wiring board unit connected to the first head actuator and the second head actuator. The wiring board unit comprises a flexible printed wiring board including a base portion and at least two extension portions extending from the base portion, each of the extension portions comprises a joint portion provided with a plurality of connection pads and a cutting work trace portion, one joint portion is attached to the first actuator block, the connection end portion of the first wiring member is joined to the connection pads, another joint portion is attached to the second actuator block, and the connection end portion of the second wiring member is joined to the connection pads.

It should be noted that the disclosure is merely an example, and a person skilled in the art can appropriately change the present invention without departing from the scope of the present invention, and it is naturally included in the scope of the present invention. Further, in order to make the description clearer, the drawings may schematically show the width, thickness, shape, and the like of each part as compared with the actual mode. However, this is merely an example, and the interpretation of the present invention is not limited. Further, in the specification and the drawings, the components similar to those described in regard to previous drawings are designated by the same reference numerals, and detailed description may be omitted as appropriate.

First Embodiment

Figure 1:
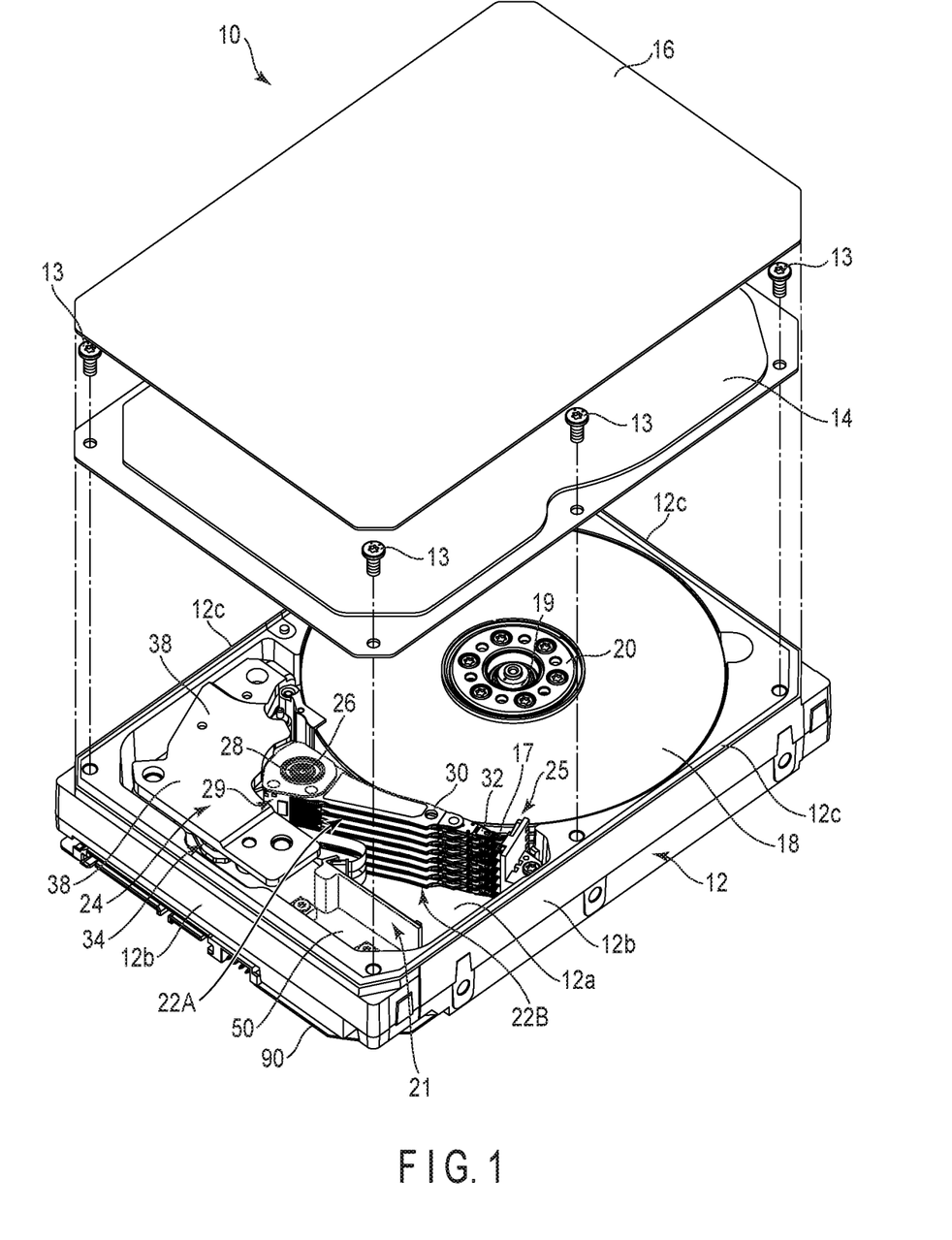
FIG. 1 is a perspective view illustrating a hard disk drive (HDD) with a top cover exploded according to a first embodiment.

As a disk device, a hard disk drive (HDD) according to the embodiment will be described in detail. FIG. 1 is a perspective view of the HDD according to a first embodiment illustrated with a top cover removed.

As illustrated, the HDD includes a substantially rectangular housing 10. The housing 10 comprises a rectangular box-shaped base 12 having an open upper surface, an inner cover 14 screwed to the base 12 with a plurality of screws 13 to close the upper end opening of the base 12, and an outer cover (top cover) 16 which is arranged so as to overlap the inner cover 14 and has a peripheral edge welded to the base 12. The base 12 includes a rectangular bottom wall 12a opposing the inner cover 14 with a gap, a side wall 12b provided upright along the periphery of the bottom wall 12a, and, for example, is integrally formed of aluminum. The side wall 12b includes a pair of long side walls facing each other and a pair of short side walls facing each other. A fixing rib 12c having a substantially rectangular frame shape is provided on the upper end surface of the side wall 12b so as to project.

The inner cover 14 is formed of, for example, stainless steel into a rectangular plate shape. The peripheral edge of the inner cover 14 is screwed to the upper surface of the side wall 12b with screws 13 so that the inner cover is fixed to the inside of the fixing rib 12c. The outer cover 16 is formed of aluminum into a rectangular plate shape, for example. The outer cover 16 has a plane dimension slightly larger than that of the inner cover 14. In the outer cover 16, the peripheral edge thereof is welded to the fixing rib 12c of the base 12 along the entire circumference so that the outer cover is airtightly fixed to the base 12.

A plurality of, for example, nine magnetic disks 18 as recording media and a spindle motor 19 as a drive unit for supporting and rotating the magnetic disks 18 are provided in the housing 10. The spindle motor 19 is arranged on the bottom wall 12a. Each magnetic disk 18 is, for example, formed to have a diameter of 96 mm (about 3.5 inches) and has a magnetic recording layer on the upper surface and/or lower surface thereof. The magnetic disks 18 are coaxially fitted to a hub (not illustrated) of the spindle motor 19 and are fixed to the hub by a clamp spring 20. The plurality of magnetic disks 18 are stacked in parallel with each other at predetermined intervals and are further supported in a state of being positioned substantially parallel to the bottom wall 12a of the base 12. The magnetic disks 18 are rotated at a predetermined rotation speed by the spindle motor 19.

Incidentally, the number of magnetic disks 18 is not limited to nine and can be increased or decreased to, for example, 7 to 12 or more or less.

A plurality of magnetic heads 17 for recording and reading information on the magnetic disk 18 and a head actuator assembly (hereinafter referred to as a head actuator) movably supporting the magnetic heads 17 with respect to the magnetic disk 18 are provided in the housing 10. In this embodiment, the head actuator is configured as a multi-head actuator which includes a plurality of head actuators that can operate independently, for example, a first head actuator 22A and a second head actuator 22B. Each of the first and second head actuators 22A and 22B is rotatably supported around a common support shaft (pivot) 26 that is provided upright on the bottom wall 12a of the base 12.

A voice coil motor (VCM) 24 which rotates and positions the first and second head actuators 22A and 22B, a ramp load mechanism 25 which holds the magnetic heads 17 at an unload position apart from the magnetic disks 18 when the magnetic heads 17 move to the outermost periphery of the magnetic disks 18, and a wiring board unit (FPC unit) 21 on which electronic components such as a conversion connector are mounted are provided inside the housing 10. As will be described later, the wiring board unit 21 comprises a flexible printed circuit board (FPC) including connection end portions as many as the head actuators, and a metal plate (backing plate) fixed to a predetermined portion of the FPC.

A printed circuit board 90 is screwed to the outer surface of the bottom wall 12a. The printed circuit board 90 configures a controller which controls the operation of the spindle motor 19 and controls the operation of the VCM 24 and the magnetic heads 17 through the wiring board unit 21.

Figure 2:
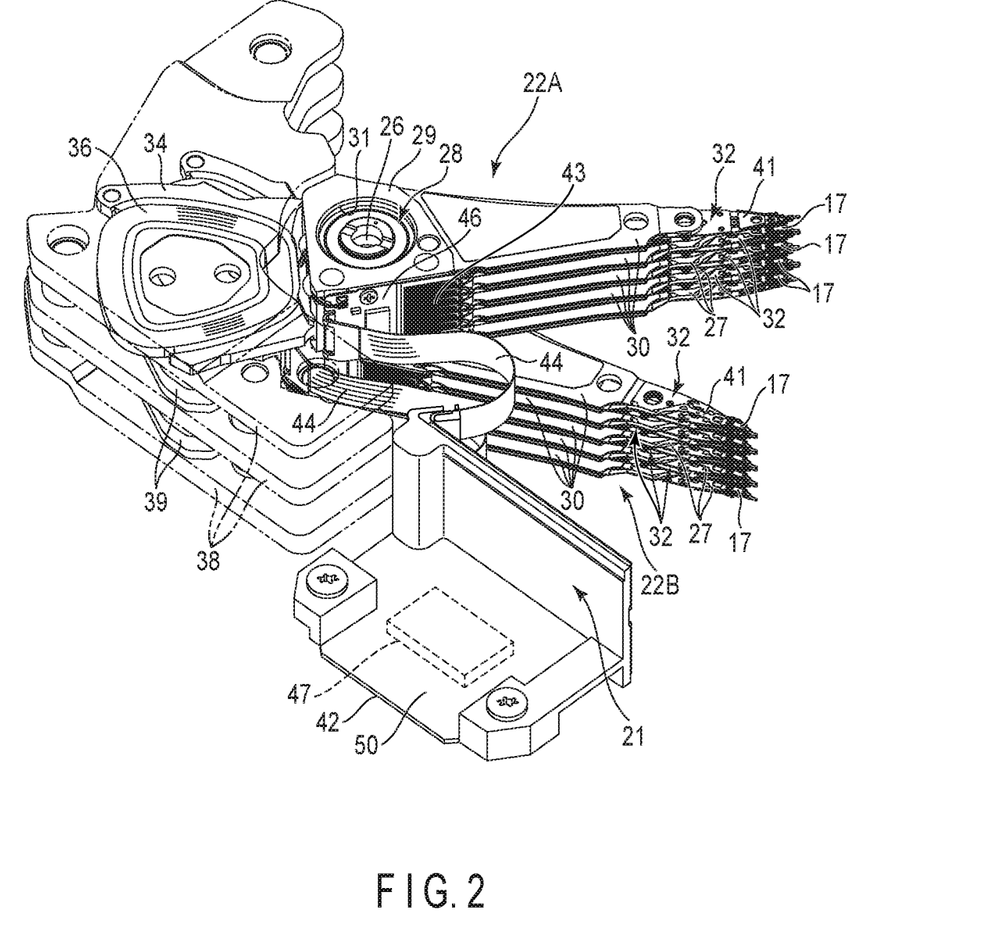
FIG. 2 is a perspective view illustrating a head actuator and a wiring board unit of the HDD.

Next, an actuator assembly including the head actuators 22A and 22B and the wiring board unit 21 will be described in detail. FIG. 2 is a perspective view illustrating the actuator assembly, and FIG. 3 is a perspective view illustrating the actuator assembly in an aligned state.

Figure 3:
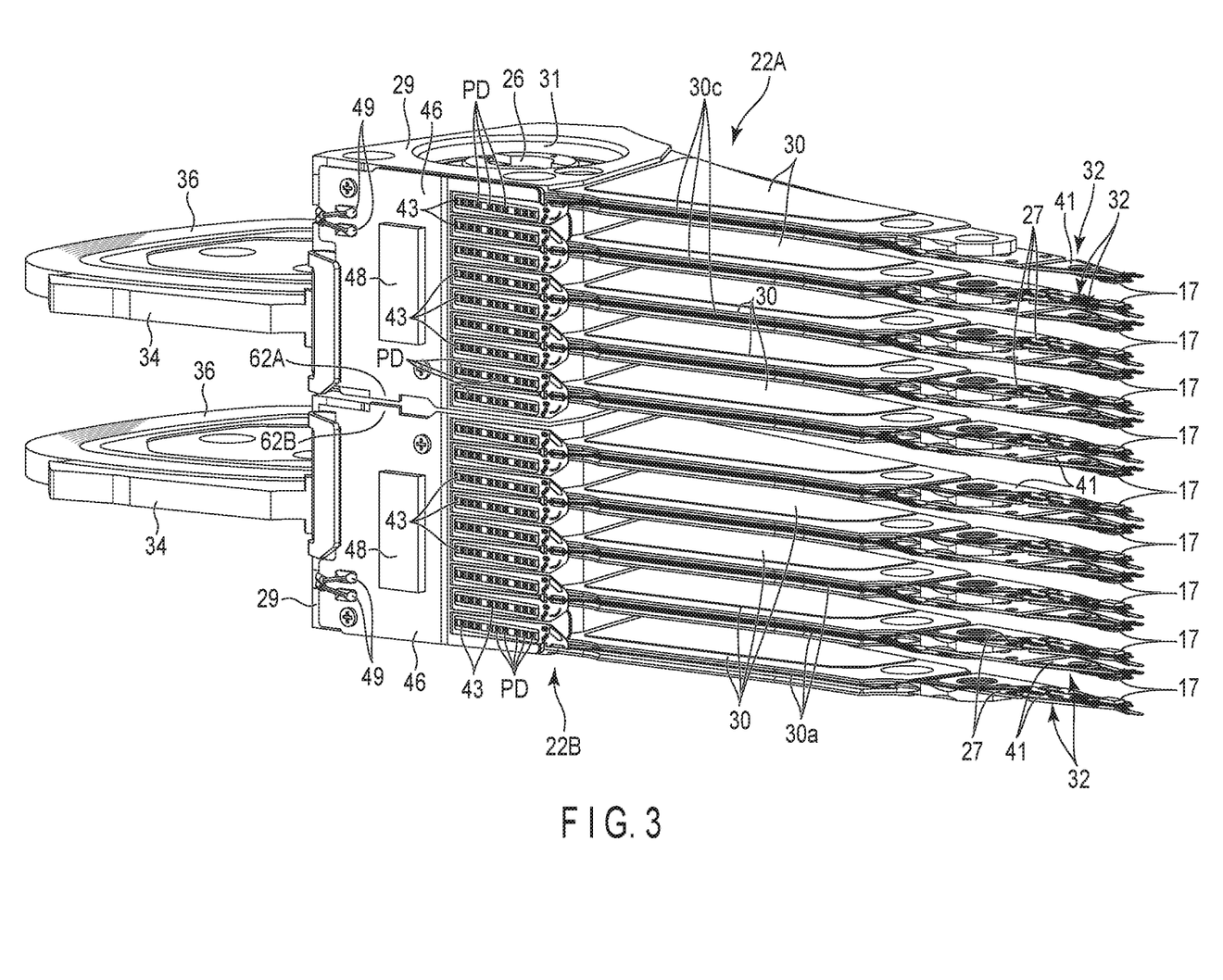
FIG. 3 is a perspective view illustrating a part of the head actuator and the wiring board unit.

As illustrated in FIGS. 2 and 3, the actuator assembly comprises the first head actuator 22A, the second head actuator 22B, and the wiring board unit (FPC unit) 21 connected to these.

The first head actuator 22A and the second head actuator 22B are arranged to overlap each other in a direction perpendicular to the bottom wall 12a and are provided independent from each other rotatably around the common support shaft 26 provided upright on the bottom wall 12a. The first head actuator 22A and the second head actuator 22B have substantially the same structure and substantially the same size. In one example, the head actuator arranged on the upper side (close to the top covers 14 and 16) is the first head actuator 22A, and the head actuator arranged on the lower side (close to the bottom wall 12a) is the second head actuator 22B.

The first head actuator 22A comprises an actuator block (first actuator block) 29, five arms 30 extending from the actuator block 29, a head suspension assembly (sometimes referred to as a head gimbal assembly (HGA)) 32 attached to each arm 30, and a magnetic head 17 supported by the head suspension assembly. The actuator block 29 has an inner hole 31, and a bearing unit (unit bearing) 28 is mounted in the inner hole 31. The actuator block 29 is rotatably supported by the support shaft 26 by the bearing unit 28.

In this embodiment, the actuator block 29 and the five arms 30 are integrally molded of aluminum or the like to form a so-called E block. The arm 30 is, for example, formed in an elongated flat plate shape and extends from the actuator block 29 in a direction orthogonal to the support shaft 26. The five arms 30 are provided in parallel with each other with a gap therebetween.

The first head actuator 22A includes a support frame 34 extending from the actuator block 29 in the direction opposite to the arms 30. A voice coil 36 is supported by the support frame 34. The voice coil 36 is positioned between a pair of yokes 38 installed on the base 12, and configures the VCM 24 together with the yokes 38 and the magnet 39 fixed to one of the yokes 38.

The first head actuator 22A comprises nine head suspension assemblies 32, and the head suspension assemblies 32 are attached to the extended ends of the arms 30, respectively. The plurality of head suspension assemblies 32 include up-head head suspension assemblies which support the magnetic heads 17 upward and down-head head suspension assemblies which support the magnetic heads 17 downward. The up-head and down-head suspension assemblies are configured by arranging head suspension assemblies having the same structure in vertically different directions. In this embodiment, in the first head actuator 22A, the down-head suspension assembly is attached to the uppermost arm 30, and two head suspension assemblies 32 of the up-head suspension assembly and the down-head suspension assembly are attached to each of the other four arms 30.

The suspension assembly 32 comprises a suspension 41 configured by a substantially rectangular base plate and an elongated leaf spring-shaped load beam and an elongated strip-shaped flexure (first wiring member) 27 provided on the suspension 41. The flexure 27 includes a metal plate (backing layer) such as stainless steel, an insulating layer formed on the metal plate, a conductive layer configuring a plurality of wirings (wiring patterns) formed on the insulating layer, and a cover layer (protective layer, insulating layer) covering the conductive layer. The flexure 27 forms an elongated strip-shaped laminated plate. The flexure 27 includes a distal end side portion and a proximal end side portion. The distal end side portion of the flexure 27 is attached to the surface of the suspension 41. The flexure 27 has a displaceable gimbal portion (elastic support portion) positioned at the extended end portion of the suspension 41. The magnetic head 17 is mounted on the gimbal portion. The wirings of the flexure 27 are electrically connected to the read element, the write element, the heater, and other members of the magnetic head 17. Incidentally, the suspension assembly 32 may have a piezoelectric element or the like which functions as a microactuator. In this case, the piezoelectric element is arranged on the flexure 27 in the vicinity of the magnetic head 17 and is electrically connected to the wiring of the flexure 27.

The proximal end side portion of the flexure 27 extends outward from the side edge of the suspension 41, and then extends through a slit 32a formed on the side surface of the arm 30 to the proximal end of the arm 30 and the actuator block 29. A connection end portion (tail connection terminal portion) 43 of the flexure 27 is formed at the rear end of the proximal end side portion. The connection end portion 43 is formed in an elongated rectangular shape. The connection end portion 43 is provided with a plurality, for example, nine connection terminals (connection pads) PD. These connection terminals PD are electrically connected to the magnetic head 17 and the piezoelectric element through the wirings of the flexure 27.

Further, a joint portion 46 of the wiring board unit 21 (to be described later) is mounted on the installation surface of the actuator block 29. The connection end portion 43 of the flexure 27 is joined to the joint portion 46. The connection terminals PD of each connection end portion 43 are soldered to connection pads (not illustrated) provided in the joint portion 46, and are electrically and mechanically joined to the joint portion 46. Incidentally, the input/output terminals of the voice coil 36 are soldered to connection pads 49 provided on the joint portion 46.

On the other hand, the second head actuator 22B has almost the same configuration as that of the first head actuator 22A. As illustrated in FIGS. 2 and 3, the second head actuator 22B includes an actuator block (second actuator block) 29 having a bearing unit built therein, five arms 30 extending from the actuator block 29, nine head suspension assemblies 32 attached to the arms 30, magnetic heads 17 mounted on the respective head suspension assemblies 32, and a support frame 34 supporting the voice coil 36.

The actuator block 29 is rotatably supported by the support shaft 26 through a bearing unit. The actuator block 29 is supported by the proximal end portion (half portion on the bottom wall 12a side) of the support shaft 26, and is coaxially arranged below the first actuator block 29. The actuator block (second actuator block) 29 faces the first actuator block 29 with a slight gap.

In the second head actuator 22B, the up-head suspension assembly is attached to the lowermost arm 30, and two head suspension assemblies 32 of the up-head suspension assembly and the down-head suspension assembly are attached to each of the other four arms 30.

The flexure (second wiring member) 27 of each head suspension assembly 32 has a connection end portion 43 positioned on the actuator block 29. The joint portion 46 of the wiring board unit 21 (to be described later) is arranged on the installation surface of the actuator block 29. The connection end portion 43 of each flexure 27 is joined to the joint portion 46. The connection terminal PD of the connection end portion 43 is soldered to a connection pad (not illustrated) provided in the joint portion 46, and is electrically and mechanically joined to the joint portion 46.

The voice coil 36 of the second head actuator 22B is positioned between the pair of yokes 38 installed on the base 12, and configures the VCM 24 together with the yokes 38 and the magnet 39 fixed to one of the yokes.

The VCM 24 which drives the first head actuator 22A and the VCM 24 which drives the second head actuator 22B are provided independently of each other. As a result, the first head actuator 22A and the second head actuator 22B can be independently driven (rotated).

Next, the configuration of the wiring board unit 21 will be described.

Figure 4:
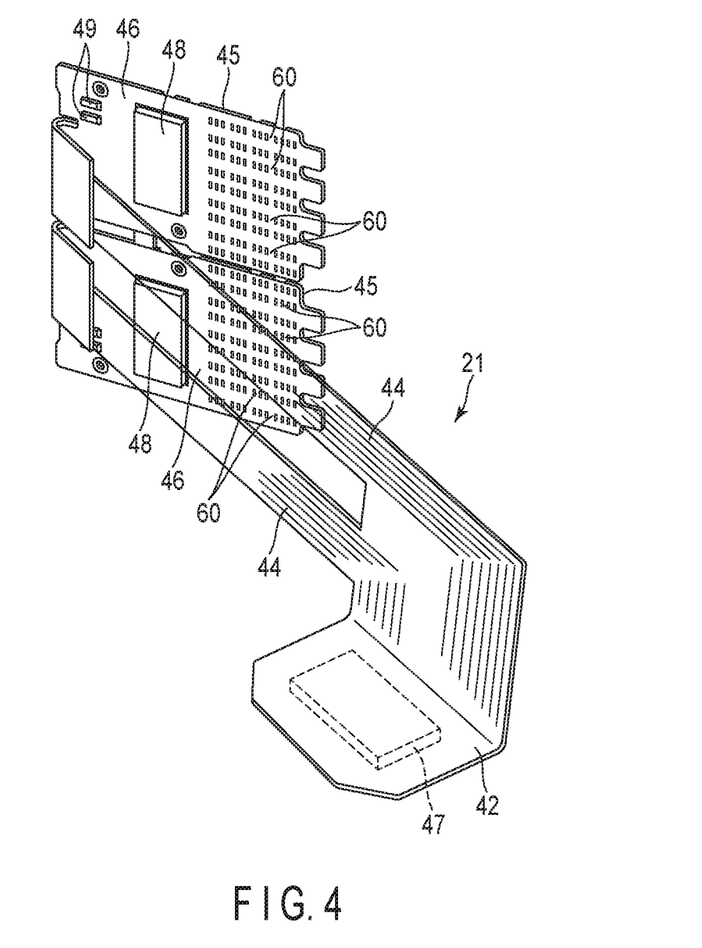
FIG. 4 is a perspective view schematically illustrating the wiring board unit.

FIG. 4 is a perspective view illustrating the wiring board unit 21. As illustrated in the drawing, the wiring board unit (FPC unit) 21 includes a substantially rectangular base portion 42, two elongated strip-shaped relay portions 44 extending bifurcated from one side edge of the base portion 42, and two joint portions 46 provided continuously at the respective extended ends of the relay portions 44. The base portion 42, the relay portions 44, and the joint portions 46 are integrally formed by a flexible printed circuit (wiring) board (FPC). The flexible printed wiring board includes a base insulating layer such as polyimide, a conductive layer which is formed on the base insulating layer and forms a plurality of wirings, connection pads, and the like, and a protective layer which covers the conductive layer.

A plurality of electronic components such as a conversion connector 47 and a capacitor (not illustrated) are mounted on the base portion 42 and electrically connected to the wiring of the FPC. In one example, the base portion 42 is fixed to a support body 50 (see FIG. 2) formed of a metal such as aluminum or a resin in a state of being bent in an L shape. The base portion 42 and the support body 50 are installed on the bottom wall 12a of the base 12. The conversion connector 47 is electrically connected to the back side printed circuit board 90 through the bottom wall 12a.

The two relay portions 44 extend substantially parallel from the side edge of the base portion 42 toward the first and second head actuators 22A and 22B. The joint portion 46 provided at the extended end of the relay portion 44 is formed in a substantially rectangular shape. A plurality of connection pad groups 60 (to be described later) are provided on one surface of each joint portion 46, and a semiconductor element such as a head IC 48 is mounted. A backing plate 45 made of, for example, an aluminum alloy is attached as a reinforcing plate to the back surface of the joint portion 46. The backing plate 45 has substantially the same size and shape as the joint portion 46. Since two relay portions 44 to which the backing plate 45 is not attached can be flexibly bent, each of the two joint portions 46 which are bifurcated can move freely. As a result, the first head actuator 22A and the second head actuator 22B can independently rotate. Incidentally, the relay portion 44, the joint portion 46, and the backing plate 45 form an extension portion extending from the base portion 42.

Figure 5:
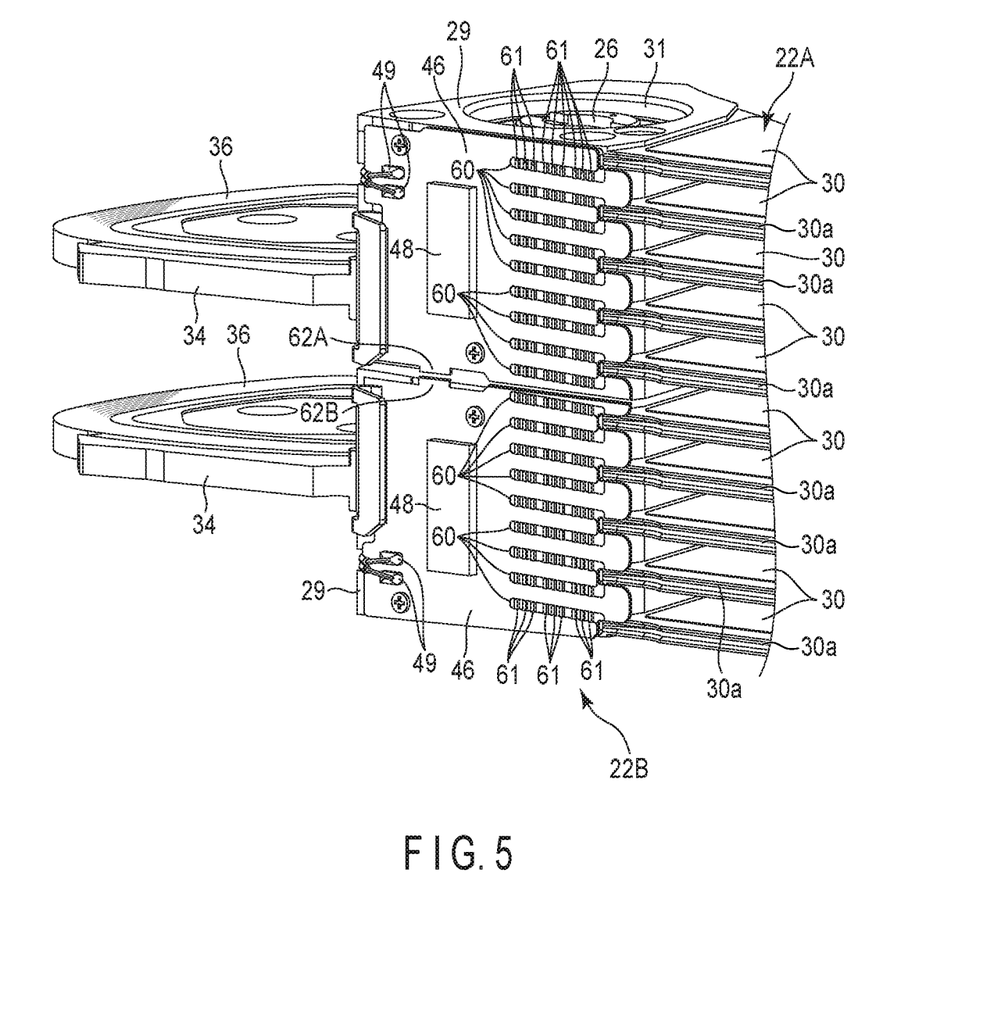
FIG. 5 is a perspective view illustrating an actuator block portion of the head actuator and a joint portion of the wiring board unit.

FIG. 5 is a perspective view illustrating a part of the first and second actuators to which the joint portions 46 are attached. As illustrated, each joint portion 46 of the wiring board unit 21 is formed in a rectangular shape having a size slightly smaller than the installation surface (side surface) of the actuator block 29. The two joint portions 46 are respectively attached to one side surface (installation surface) of the first actuator block 29 and one side surface (installation surface) of the second actuator block 29 through the backing plate 45 and further fixed to the installation surface with fixing screws.

The joint portion 46 includes nine connection pad groups 60 corresponding to the connection end portions 43 of the flexures 27. Each connection pad group 60 includes, for example, nine connection pads 61 arranged in a line. Each connection pad 61 is electrically connected to the connector 47 on the base portion 42 through the wirings of the FPC and the head IC 48. Each connection pad group 60 extends in a direction slightly inclined with respect to a direction substantially orthogonal to the support shaft 26. The nine connection pad groups 60 are arranged side by side in the axial direction of the support shaft 26 at intervals. The nine connection pad groups 60 are provided at a position adjacent to the proximal end of the arm 30 at the joint portion 46.

The head IC (head amplifier) 48 mounted on the joint portion 46 is connected to the connection pad 61 and the base portion 42 through wiring. Further, the joint portion 46 includes the connection pad 49 to which the voice coil 36 is connected.

The lower edge of the joint portion 46 attached to the first actuator block 29 and the upper edge of the joint portion 46 attached to the second actuator block 29 face each other with a predetermined gap. In this embodiment, the joint portion 46 attached to the first actuator block includes a convex portion 62A slightly protruding from the lower edge. The convex portion 62A is a cutting work trace portion which remains after cutting the temporary connection portion (to be described later). Similarly, the joint portion 46 attached to the second actuator block includes a convex portion 62B slightly protruding from the upper edge. The convex portion 62B is a cutting work trace portion which remains after cutting the temporary connection portion (to be described later). Incidentally, the cutting work trace portion is not limited to the convex portion and may be a cutting trace surface flushing with the side edge.

As illustrated in FIGS. 2 and 3, the connection end portion 43 of each flexure 27 is arranged so as to overlap the corresponding connection pad group 60 of the joint portion 46, and nine connection terminals PD of the connection end portion 43 are electrically and mechanically joined to the corresponding respective connection pads 61 by soldering.

As a result, each of the nine magnetic heads 17 of the first head actuator 22A is electrically connected to the conversion connector 47 of the base portion 42 through the wirings of the flexure 27, the connection end portion 43, the joint portion 46, and the relay portion 44 of the wiring board unit 21. Similarly, each of the nine magnetic heads 17 of the second head actuator 22B is electrically connected to the conversion connector 47 of the base portion 42 through the wirings of the flexure 27, the connection end portion 43, the joint portion 46, and the relay portion 44 of the wiring board unit 21. Further, the base portion 42 is electrically connected to the printed circuit board 90 on the bottom surface side of the housing 10 through the conversion connector 47.

Next, an example of a method of manufacturing the actuator assembly will be described as a method of manufacturing the HDD configured as described above.

Figure 6:
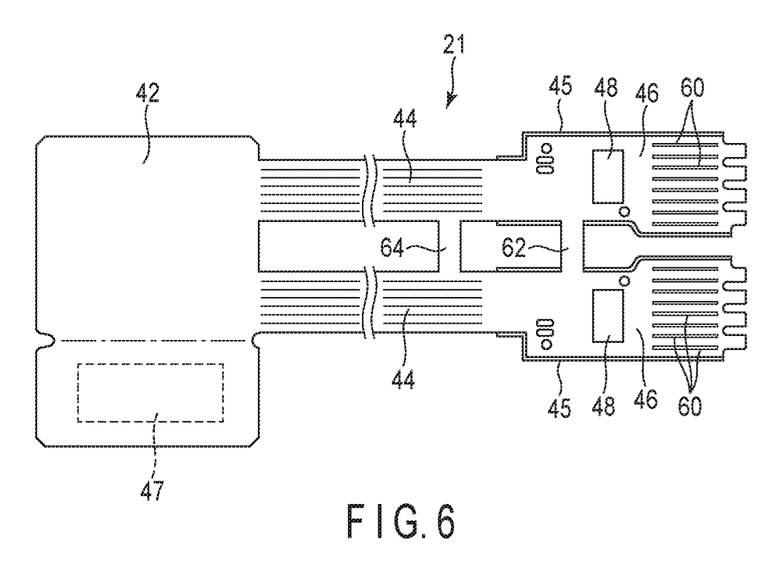
FIG. 6 is a plan view of the wiring board unit in a state where the wiring board units are connected to each other by a temporary connection portion.
Figure 7:
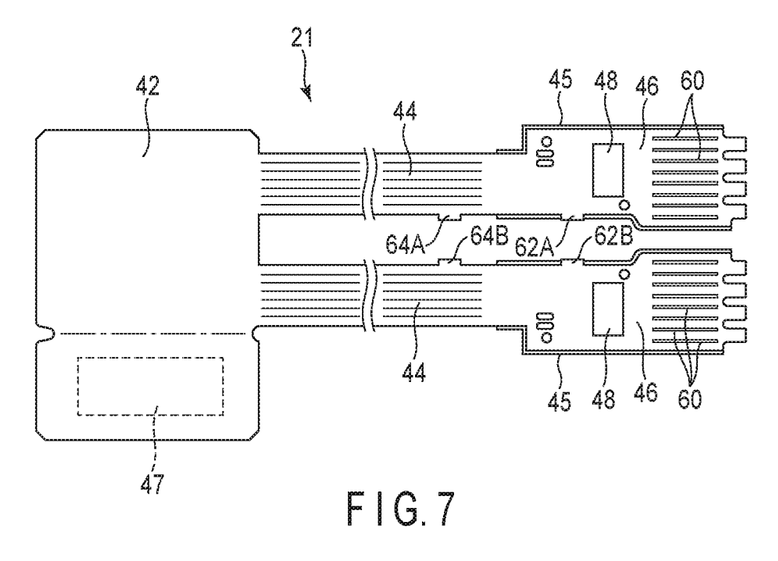
FIG. 7 is a plan view of the wiring board unit with the connection portion removed.

FIG. 6 is a plan view of the wiring board unit 21 during manufacturing, and FIG. 7 is a plan view illustrating a state in which the temporary connection portion of the wiring board unit 21 is cut.

As illustrated in FIG. 6, at the time of manufacturing, the FPC of the wiring board unit 21 is formed to integrally include the base portion 42, the two relay portions 44, the joint portions 46 provided at the extended ends of the relay portions, a temporary connection portion 62 which connects the joint portions 46, and a temporary connection portion 64 which connects the relay portions 44. The temporary connection portion 62 has, for example, a strip shape with a predetermined width, and is provided between the side edges of the two joint portions 46 facing each other. The temporary connection portion 64 has, for example, a strip shape with a predetermined width, and is provided between the side edges of the two relay portions 44 facing each other.

The backing plate 45 is attached to the back surface of each joint portion 46 of the wiring board unit 21. An electronic component, here, the head IC 48 is mounted on each joint portion 46. The conversion connector 47 is mounted on the base portion 42. The base portion 42 is attached to the support body 50 described above.

Next, the wiring board unit 21 is placed at a predetermined position. In one example, the wiring board unit 21 is installed at a predetermined position in the housing 10 by installing the base portion 42 and the support body 50 on the bottom wall 12a of the housing 10 and fixing the base portion and the support body with screws. Subsequently, as illustrated in FIG. 5, the two joint portions 46 are respectively attached to the first actuator block 29 of the first head actuator 22A and the second actuator block 29 of the second head actuator 22B through the backing plate 45 and further fixed to the installation surface of the actuator block with fixing screws.

After the joint portion 46 is attached to the actuator block 29, as illustrated in FIG. 7, both ends of the temporary connection portion 62 are cut, and the temporary connection portion 62 is cut off from the two joint portions 46. At the same time or subsequently, both ends of the temporary connection portion 64 are cut, and the temporary connection portion 64 is separated (cut off) from the two relay portions 44. In one example, at the time of cutting, the temporary connection portion 62 is cut such that the convex portions 62A and 62B remain as the cutting work trace portions on the side edges of the two joint portions 46. Similarly, the temporary connection portion 64 is cut such that the convex portions 64A and 64B remain as the cutting work trace portions on the side edges of the two relay portions 44.

Incidentally, since the temporary connection portions 62 and 64 are formed of FPC, the temporary connection portions 62 and 64 can be cut and removed with a simple tool such as scissors, and further, metal contamination is not generated by the cutting.

Next, as illustrated in FIGS. 2 and 3, the connection end portions 43 of the flexures 27 of the first head actuator 22A are arranged so as to overlap the corresponding connection pad groups 60 of the joint portion 46, and the nine connection terminals PD of the connection end portion 43 are electrically and mechanically joined to the corresponding connection pads 61 by soldering, respectively. Similarly, the connection end portions 43 of the flexures 27 of the second head actuator 22B are arranged so as to overlap the corresponding connection pad groups 60 of the joint portion 46, and the nine connection terminals PD of the connection end portion 43 are electrically and mechanically joined to the corresponding connection pads 61 by soldering, respectively. Further, the connection terminal of the voice coil 36 is connected to the connection pad 49 of the joint portion 46 by soldering.

The actuator assembly is assembled by the above manufacturing process.

Incidentally, the assembly of the actuator assembly may be performed with the first head actuator 22A and the second head actuator 22B mounted on the support shaft 26 of the housing 10, or the assembly may be performed independently before installation in the housing 10.

Further, in the above-described example, the temporary connection portions 62 and 64 are removed after the two joint portions 46 are attached to the actuator block 29. However, the invention is not limited to this process, and the two joint portions 46 may be attached to the actuator block 29 after the temporary connection portions 62 and 64 are removed. Furthermore, the temporary connection portions 62 and 64 are cut such that the convex portions 62A and 62B and the convex portions 64A and 64B remain as the cutting work trace portions. However, the invention is not limited to this process, and the temporary connection portions 62 and 64 may be cut such that cut surfaces or cut traces flushing with the side edge remain as the cutting work trace portions.

According to the HDD and the method of manufacturing the HDD according to the first embodiment configured as described above, the wiring board unit 21 includes the common base portion and the two bifurcated extension portion (the relay portion and the joint portion) extending from the base portion, and is configured as one component or one unit. Therefore, the wiring board unit 21 can reduce the manufacturing cost and improve the assemblability as compared with the case of using a plurality of independent wiring board units for the plurality of head actuators. By using the wiring board unit in which the two extension portions (the relay portion and the joint portion) are connected to each other by the temporary connection portions 62 and 64, it is possible to prevent the relative position shift of the two extension parts when the electronic component is mounted on the FPC in a component state. Further, when the wiring board unit in a component state is transported, mutual interference between the two extension portions can be prevented, and damage to the extension portions can be prevented.

When the two joint portions in the state of being connected by the temporary connection portion are attached to the actuator block, it is possible to suppress the position shift between the two joint portions and to easily perform the attaching work to the actuator block. Further, in a case where the joint portion is attached to the actuator block after the temporary connection portion is removed, the temporary connection portion can be easily removed.

As described above, according to the first embodiment, it is possible to obtain the disk device and the method for manufacturing the disk device with improved manufacturability.

Next, a wiring board unit according to another embodiments and modifications will be described. In various embodiments and modifications described below, the same portions as those in the first embodiment described above are designated by the same reference numerals, and detailed description thereof will be omitted or simplified. Portions different from the first embodiment will be described mainly.

(First Modification)

Figure 8:
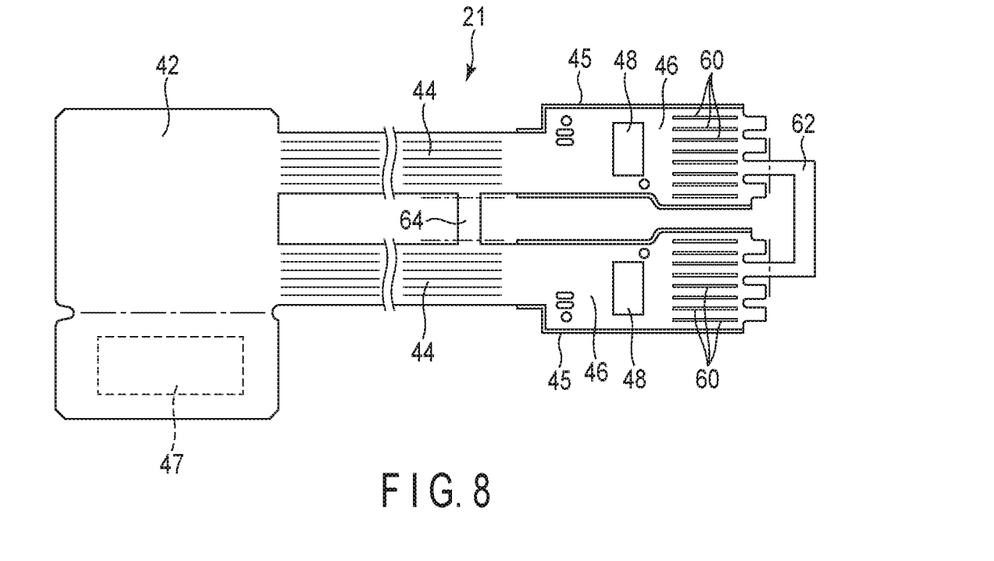
FIG. 8 is a plan view illustrating a wiring board unit during manufacturing according to a first modification.

FIG. 8 is a plan view of a wiring board unit during manufacturing according to a first modification.

As illustrated in the drawing, according to the first modification, a FPC (flexible printed circuit board) which configures a wiring board unit 21 includes a temporary connection portion 62 which connects two joint portions 46 and a temporary connection portion 64 that connects two relay portions 44. In the first modification, the temporary connection portion 62 is formed, for example, in a substantially U shape, and each of a pair of end portions is connected to the end edge of the joint portion 46 on the extended end side.

At the time of assembling the actuator assembly, the temporary connection portions 62 and 64 are removed at the position indicated by a two-dot chain line such that convex portions remain as cutting work trace portions.

According to the first modification, by providing the temporary connection portion 62 of the joint portion 46 on the extended end side, the work of removing the temporary connection portion 62 becomes easy. Further, since the uncut residual convex portion formed after the temporary connection portion 62 is removed is formed at the end edge of each joint portion 46 on the distal end side, both convex portions do not interfere with each other even in a case where a position shift occurs due to an assembly error of the actuator assembly.

(Second Modification)

Figure 9:
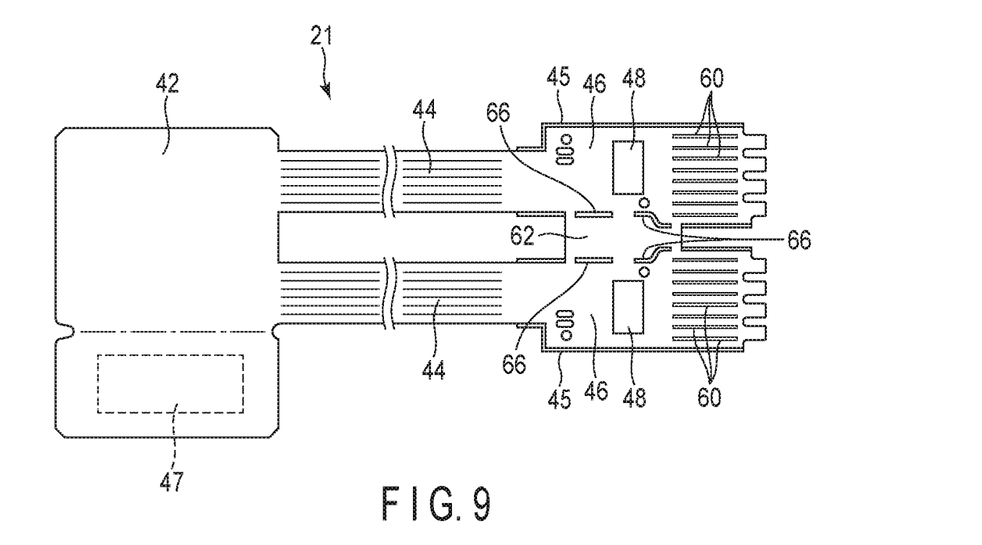
FIG. 9 is a plan view illustrating a wiring board unit during manufacturing according to a second modification.

FIG. 9 is a plan view of a wiring board unit during manufacturing according to a second modification.

As illustrated in the drawing, according to the second modification, a FPC forming a wiring board unit 21 integrally includes a temporary connection portion 62 which connects two joint portions 46. The temporary connection portion 62 has, for example, a relatively wide strip shape, and is provided between the side edges of the two joint portions 46 facing each other.

In the second modification, the temporary connection portion 62 includes a plurality of slits (breaks) 66 which extend along the side edges of the joint portions 46, respectively. These slits 66 are provided at positions of overlapping the end edge portions of a backing plate 45.

According to the above configuration, by providing the slits 66 in the temporary connection portion 62 of the FPC, the cutting work of the temporary connection portion 62 becomes easy. Further, by providing the slit 66 on the inner side from the end edge of the backing plate 45, it is possible to lower (reduce) the uncut residual convex portion formed after cutting, so that the convex portions do not interfere with each other.

Second Embodiment

Figure 10:
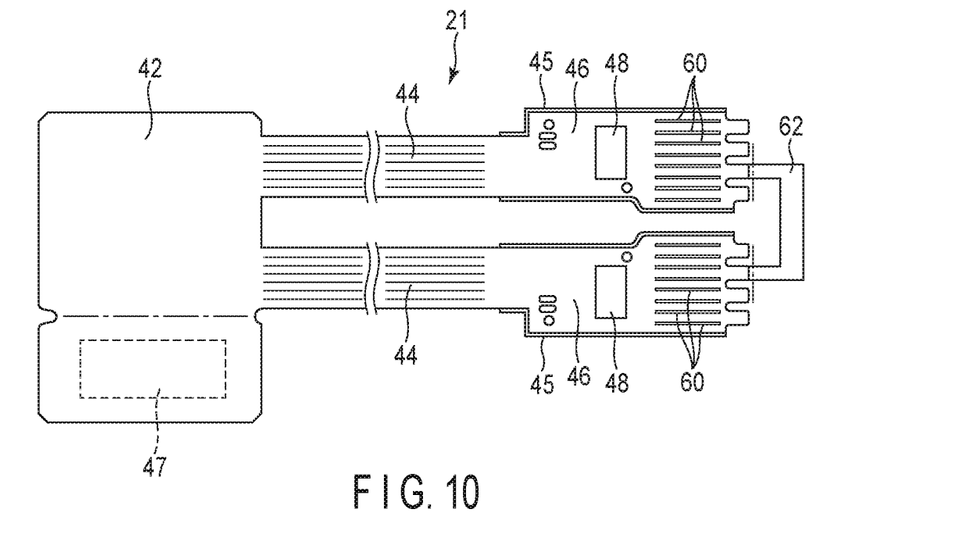
FIG. 10 is a plan view illustrating a wiring board unit during manufacturing according to the second embodiment.
Figure 11:
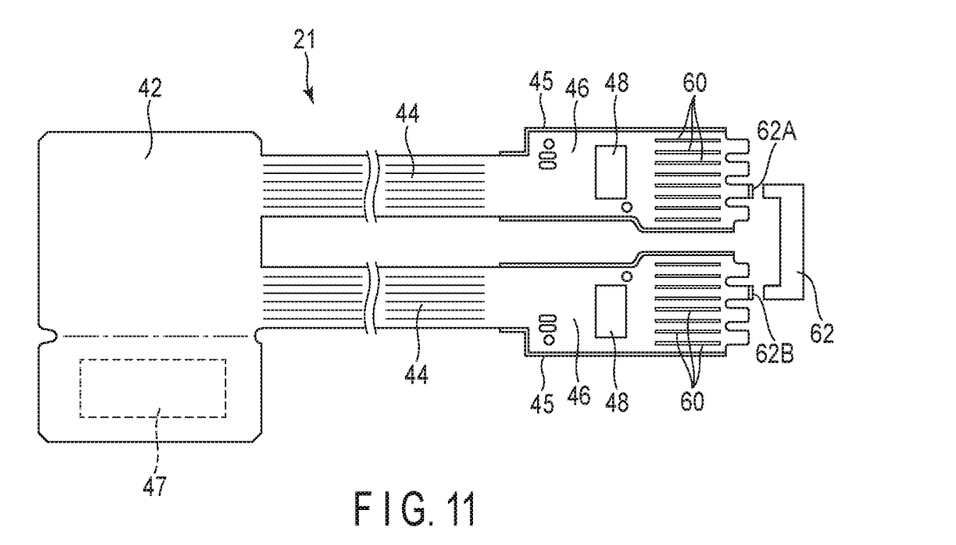
FIG. 11 is a plan view illustrating the wiring board unit in a state where the temporary connection portion according to the second embodiment is removed.

FIG. 10 is a plan view of a wiring board unit during manufacturing according to a second embodiment, and FIG. 11 is a plan view illustrating the wiring board unit in a state in which a temporary connection portion is cut.

As illustrated in FIG. 10, according to the second embodiment, a temporary connection portion 62 which connects two extension portions (the relay portion and the joint portion) of a wiring board unit 21 is formed to be a thin metal plate integrated with backing plates 45. The temporary connection portion 62 is formed, for example, in a substantially U shape, and a pair of end portions thereof are connected to the end edges of two backing plates 45 on the extended end side, respectively.

As illustrated in FIG. 11, when the actuator assembly is assembled, the temporary connection portion 62 is cut and removed such that convex portions 62A and 62B remain as the cutting work trace portions at the end edges of the backing plate 45, respectively.

According to the second embodiment having the above-mentioned configuration, the two backing plates 45 provided at the end portions of the two extension portions of the wiring board unit 21 are connected to each other by the temporary connection portion 62, and thus the same effect as that of the above-described first embodiment can be obtained. By providing the temporary connection portion 62 on the end edge of the backing plate 45 on the extended end side, the work of removing the temporary connection portion 62 becomes easy. Further, since the uncut residual convex portions 62A and 62B formed after the temporary connection portion 62 is removed are formed on the end edges of the backing plates 45 on the distal end side, both convex portions do not interfere with each other even in a case where a position shift occurs due to an assembly error of the actuator assembly.

(Third Modification)

Figure 12:
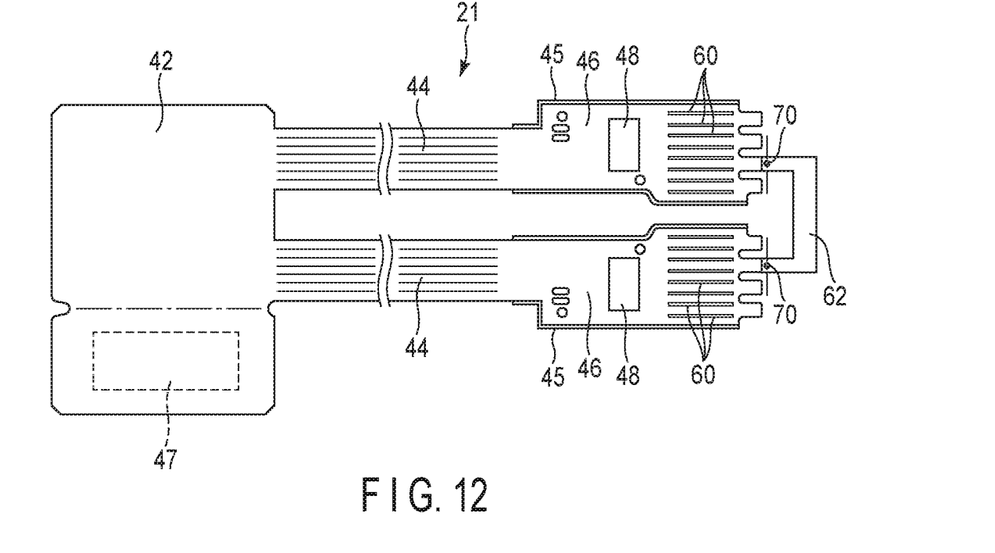
FIG. 12 is a plan view illustrating a wiring board unit during manufacturing according to a third modification.

FIG. 12 is a plan view of a wiring board unit during manufacturing according to a third modification.

As illustrated, in the modification of the second embodiment described above, through holes 70 are provided in a pair of end portions of a temporary connection portion 62, respectively. These through holes 70 are provided at the cutting positions of the temporary connection portion 62.

By providing the through holes 70 as described above, the strength of the temporary connection portion 62 at the cutting position is weakened. Accordingly, the temporary connection portion 62 is removed easily, and for example, an operator can remove the temporary connection portion 62 by manually bending the temporary connection portion 62 in an out-of-plane direction.

(Fourth Modification)

Figure 13:
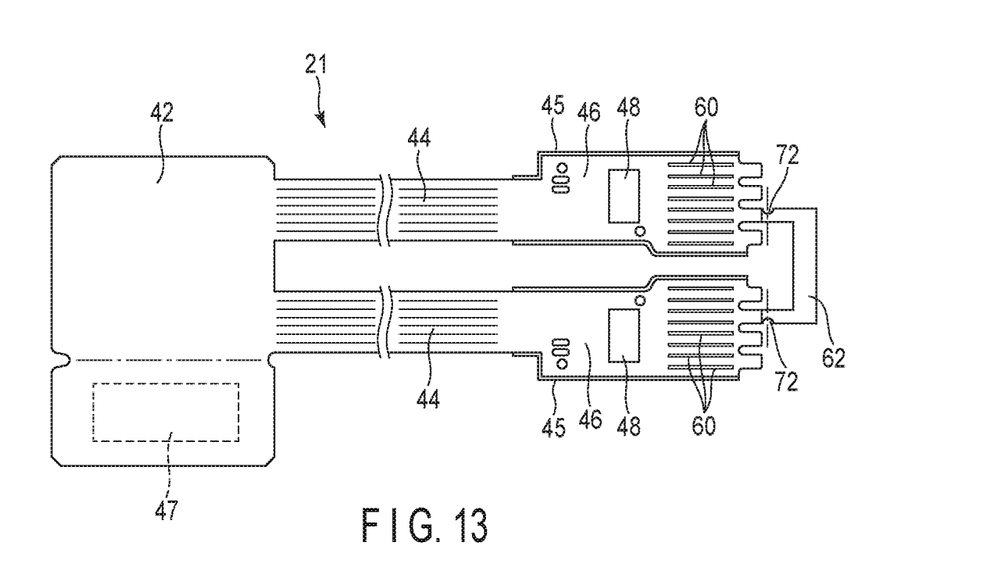
FIG. 13 is a plan view illustrating a wiring board unit during manufacturing according to a fourth modification.

FIG. 13 is a plan view of a wiring board unit during manufacturing according to a fourth modification.

As illustrated in the drawing, according to the fourth modification, notches 72 are provided at a pair of end portions of a temporary connection portion 62, respectively. These notches 72 are provided at the cutting positions of the temporary connection portion 62.

By providing the notches 72 as described above, the strength of the cutting position of the temporary connection portion 62 is weakened. As a result, also in the fourth modification, the same operational effect as in the above-described third modification can be obtained.

(Fifth Modification)

Figure 14:
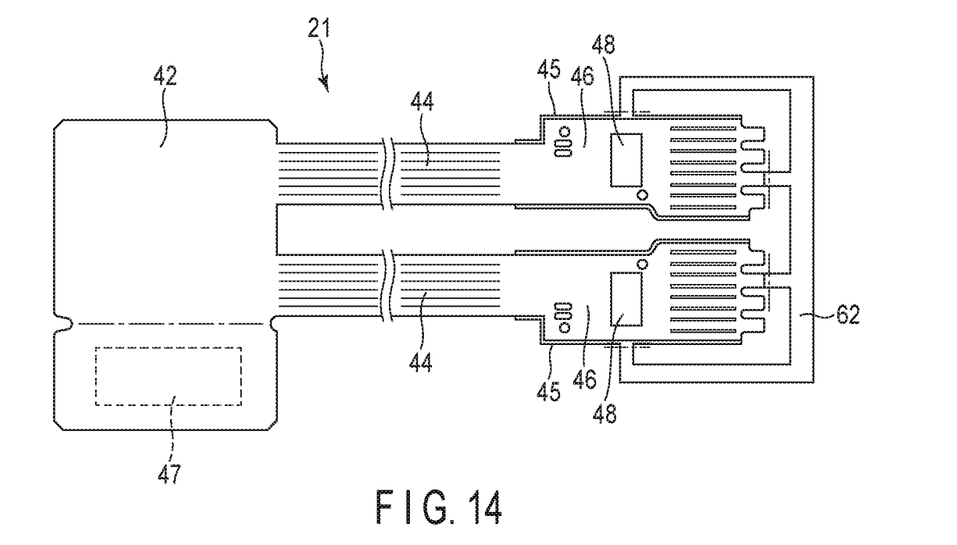
FIG. 14 is a plan view illustrating a wiring board unit during manufacturing according to a fifth modification.

FIG. 14 is a plan view of a wiring board unit during manufacturing according to a fifth modification.

As illustrated in the drawing, according to the fifth modification, a temporary connection portion 62 which connects two extension portions (the relay portion and the joint portion) of a wiring board unit 21 is formed to be a metal thin plate integrated with backing plates 45. The temporary connection portion 62 is formed, for example, in a substantially U shape, and is arranged so as to face the end edges of the two backing plates 45 on the distal end side and the side edges of the two backing plates 45 on the outside. The middle portion of the temporary connection portion 62 is connected to the end edges of the two backing plates 45 on the distal end side, and the pair of end portions of the temporary connection portion 62 are connected to the side edges of the two backing plates 45 on the outside, respectively.

When the actuator assembly is assembled, the temporary connection portion 62 is cut and removed at the positions indicated by a one-dot chain line in FIG. 14 such that convex portions remain as the cutting work trace portions at the end edge and the side edge of each backing plate 45.

According to the fifth modification, except for the side edges of the two backing plates 45 that are adjacent and opposite to each other, a plurality of other side edges and end edges are each connected by the temporary connection portion 62, whereby two extension portions of the wiring board unit 21 can be connected more stably. As a result, the stability at the time of mounting electronic components and transporting wiring board unit components is improved.

(Sixth Modification)

Figure 15:
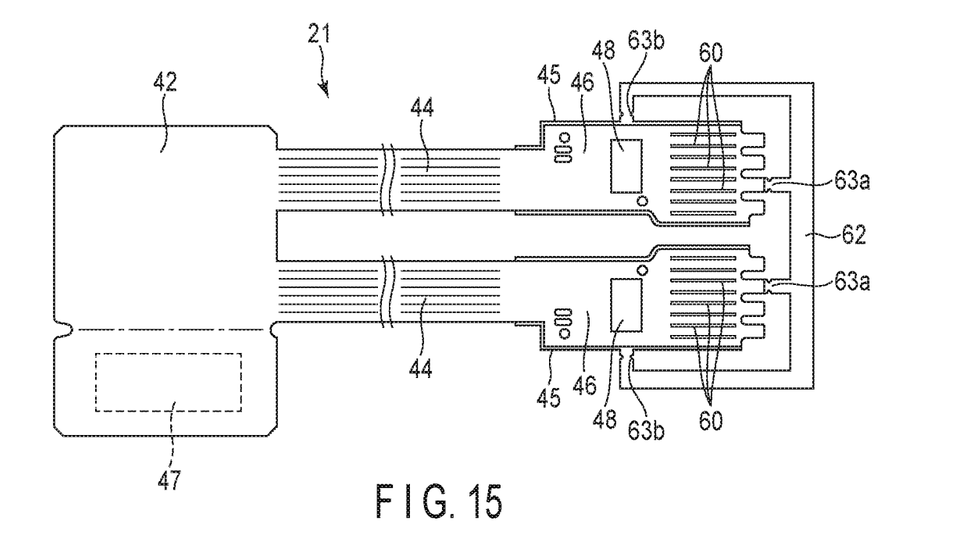
FIG. 15 is a plan view illustrating a wiring board unit during manufacturing according to a sixth modification.

FIG. 15 is a plan view of a wiring board unit during manufacturing according to a sixth modification.

As illustrated in the drawing, according to the sixth modification, notches 63a and 63b are provided at the connection portions of a temporary connection portion 62. These notches 63a and 63b are provided at the cutting positions of the temporary connection portion 62.

By providing the notches 63a and 63b as described above, the strength of the temporary connection portion 62 at the cutting position is weakened. Accordingly, the temporary connection portion 62 is removed easily, and for example, an operator can cut and remove the temporary connection portion 62 by manually bending the temporary connection portion 62 in the out-of-plane direction. Therefore, according to the sixth modification, it is possible to obtain a configuration in which the improvement of the connection strength and the ease of removing the temporary connection portion are compatible.

(Seventh Modification)

Figure 16:
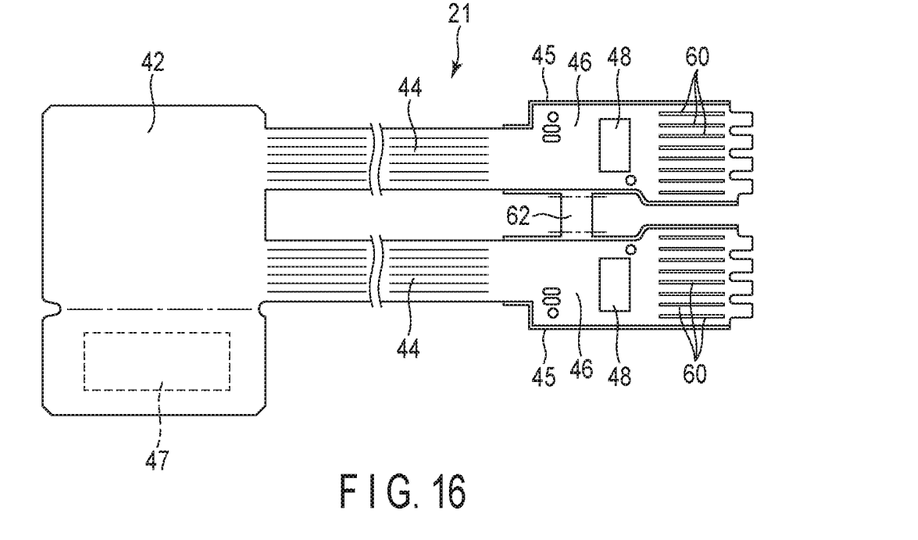
FIG. 16 is a plan view illustrating a wiring board unit during manufacturing according to a seventh modification.
Figure 17:
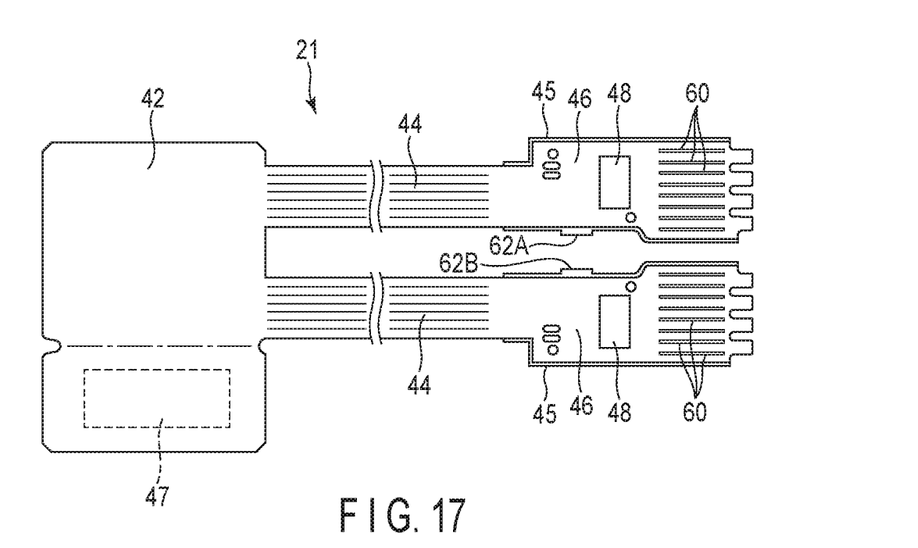
FIG. 17 is a plan view illustrating a wiring board unit in a state where a temporary connection portion according to the seventh modification is removed.

FIG. 16 is a plan view of a wiring board unit during manufacturing according to a seventh modification, and FIG. 17 is a plan view illustrating the wiring board unit in a state in which a temporary connection portion is cut.

As illustrated in FIG. 16, according to the seventh modification, a temporary connection portion 62 which connects two extension portions (the relay portion and the joint portion) of a wiring board unit 21 is formed to be a metal thin plate integrated with backing plates 45. The temporary connection portion 62 is formed in a strip shape having a predetermined width, for example. The temporary connection portion 62 is provided between the side edges of the two backing plates 45 which face each other, and is connected to these side edges. Incidentally, the temporary connection portion 62 is provided in an area having the widest distance between the side edges of the two backing plates 45 facing each other.

As illustrated in FIG. 17, when the actuator assembly is assembled, the temporary connection portion 62 is cut and removed such that convex portions 62A and 62B remain as the cutting work trace portions at the side edges of the backing plate 45, respectively.

While certain embodiments and modifications have been described, these embodiments and modifications have been presented by way of example only, and are not intended to limit the scope of the inventions. Indeed, the novel embodiments and modifications described herein may be embodied in a variety of other forms; furthermore, various omissions, substitutions and changes in the form of the embodiments and modifications described herein may be made without departing from the spirit of the inventions. The accompanying claims and their equivalents are intended to cover such forms or modifications as would fall within the scope and spirit of the inventions.

For example, the head actuators are not limited to two of first and second head actuators, but may be configured to be three or more head actuators. In this case, the wiring board unit may be configured to have a common base portion and relay portions and joint portions as many as the head actuators. The number of magnetic disks is not limited to nine, and may be ten or more or nine or less. The number of head suspension assemblies and the number of magnetic heads may be increased or decreased according to the number of magnetic disks installed. The materials, shapes, sizes, and the like of the elements configuring the disk device are not limited to those in the above-described embodiment, but may be variously changed as necessary.

What is claimed is:

1. A disk device comprising:
a plurality of disk-shaped recording media rotatably provided;
a first head actuator which comprises a first actuator block rotatably supported by a support shaft and a first wiring member including a connection end portion arranged on the first actuator block;
a second head actuator which comprises a second actuator block rotatably supported by the support shaft and a second wiring member including a connection end portion arranged on the second actuator block; and
a wiring board unit connected to the first head actuator and the second head actuator, wherein
the wiring board unit comprises a flexible printed wiring board including a base portion and at least two extension portions extending from the base portion, each of the extension portions comprises a joint portion provided with a plurality of connection pads and cutting work trace portions each with a convex shape slightly protruding from an edge of the wiring board unit, the cutting work trace portions are located at positions other than a region between the connection pads of one extension portion and the connection pads of other extension portion, one joint portion is attached to the first actuator block, the connection end portion of the first wiring member is joined to the connection pads, another joint portion is attached to the second actuator block, and the connection end portion of the second wiring member is joined to the connection pads.

2. The disk device of claim 1, wherein each of the extension portions includes at least a side edge opposed to each other with a gap and the cutting work trace portions protrude from the side edges towards each other.

3. The disk device of claim 1, where each of the joint portions includes an end edge positioned at an extended end and the cutting work trace portions formed on the end edge.

4. The disk device of claim 1, wherein each of the extension portions comprises a reinforcing plate attached to the joint portion, and each of the reinforcing plates includes at least a side edge opposed to each other with a gap and the cutting work trace portions protrude from the side edges towards each other.

5. The disk device of claim 1, wherein each of the extension portions comprises a reinforcing plate attached to the joint portion, and each of the reinforcing plates includes an end edge positioned at an extended end and the cutting work trace portions formed on the end edge.

6. The disk device of claim 1,
wherein the first actuator assembly comprises an arm and a suspension which extend from the first actuator block, a magnetic head supported by the suspension, and
the first wiring member which is provided on the arm and the suspension and includes one end portion connected to the magnetic head and the connection end portion arranged on the first actuator block, and
the second actuator assembly comprises an arm and a suspension which extend from the second actuator block, a magnetic head supported by the suspension, and the second wiring member which is provided on the arm and the suspension and includes one end portion connected to the magnetic head and the connection end portion arranged on the second actuator block.

* * * * *